United States Patent
Kim

(10) Patent No.: US 9,984,689 B1
(45) Date of Patent: May 29, 2018

(54) APPARATUS AND METHOD FOR CORRECTING PRONUNCIATION BY CONTEXTUAL RECOGNITION

(71) Applicant: Linearhub, Bundang-gu, Seongnam-si (KR)

(72) Inventor: Sung Hyuk Kim, Seongnam-si (KR)

( * ) Notice: Subject to any disclaimer, the term of this patent is extended or adjusted under 35 U.S.C. 154(b) by 0 days. days.

(21) Appl. No.: 15/348,205

(22) Filed: Nov. 10, 2016

(51) Int. Cl.
| | |
|---|---|
| G10L 15/00 | (2013.01) |
| G10L 15/22 | (2006.01) |
| G10L 15/30 | (2013.01) |
| G10L 15/18 | (2013.01) |
| G10L 25/51 | (2013.01) |
| G10L 15/08 | (2006.01) |

(52) U.S. Cl.
CPC .......... *G10L 15/22* (2013.01); *G10L 15/1815* (2013.01); *G10L 15/30* (2013.01); *G10L 25/51* (2013.01); *G10L 2015/088* (2013.01); *G10L 2015/221* (2013.01)

(58) Field of Classification Search
USPC ................................. 704/231–257, 270–275
See application file for complete search history.

(56) References Cited

U.S. PATENT DOCUMENTS

| | | | | | |
|---|---|---|---|---|---|
| 5,848,388 | A | * | 12/1998 | Power | G10L 17/02 704/239 |
| 6,754,625 | B2 | * | 6/2004 | Olsen | G10L 15/06 704/235 |
| 7,013,276 | B2 | * | 3/2006 | Bickley | G10L 15/08 704/255 |
| 7,529,678 | B2 | * | 5/2009 | Kobal | G10L 15/22 704/275 |
| 2010/0250253 | A1 | * | 9/2010 | Shen | H04R 1/1041 704/260 |
| 2016/0155436 | A1 | * | 6/2016 | Choi | G10L 15/183 704/232 |

* cited by examiner

*Primary Examiner* — Jesse Pullias
(74) *Attorney, Agent, or Firm* — Benoiot & Côté Inc.

(57) ABSTRACT

Disclosed is an apparatus and method for correcting pronunciation by contextual recognition. The apparatus may include an interface configured to receive, from a speech recognition server, first text data obtained by converting speech data to a text, and a processor configured to extract a keyword from the received first text data, calculate a suitability of a word in the first text data in association with the extracted keyword, and update the first text data to second text data by replacing, with an alternative word, a word in the first text data having a suitability less than a preset reference value.

14 Claims, 7 Drawing Sheets

| Keyword | Word | Suitability |
|---|---|---|
| UC | Broadsoft | 90% |
| UC | Portfolio | 70% |
| UC | Undefined | 20% |
| UC | Designed | 70% |
| UC | Locking | 40% |
| UC | Address | 50% |

FIG. 5

APPARATUS AND METHOD FOR CORRECTING PRONUNCIATION BY CONTEXTUAL RECOGNITION

BACKGROUND OF THE INVENTION

Field of the Invention

One or more example embodiments relate to an apparatus and method for correcting pronunciation by contextual recognition.

Description of the Related Art

A user who learns a language may endeavor to pronounce a word in the language to sound more similar to a native speaker of the language. At an initial stage of learning a language, a user may learn how to pronounce individual words in the language, but the user may find it difficult to pronounce a sentence including the individual words.

It is because pronouncing an individual word is different from pronouncing the word in a sentence in which the word is connected to other words. In addition, when producing a word in a sentence in which the word is connected to other words, pronunciation of the word may vary based on pronunciation rules in a language to which the word belongs, for example, a linking sound and an intonation. Thus, when a user who learns a language does not recognize such a linguistic variation, the user may incorrectly pronounce a word in a sentence in the language.

Therefore, there is a desire for an apparatus and method for verifying whether a sentence intended by a user is correctly recognized when the user pronounces the sentence, and analyzing whether the sentence is naturally pronounced based on a connection of words in the sentence.

SUMMARY OF THE INVENTION

An aspect provides an apparatus and method that may extract a keyword from a sentence, analyze a context of the sentence using a suitability of a word in the sentence based on a correlation between the extracted keyword and the word, and thereby provide and recommend a more natural and general expression.

Another aspect also provides an apparatus and method that may provide a speech, or a vocalized sentence, of an original sentence pronounced by a user and a sentence in which an unsuitable word is replaced with a suitable alternative word by contextual recognition, and thereby provide a difference in terms of pronunciation between words.

Still another aspect also provides an apparatus and method that may be convenient for a user by allowing the user to immediately input, as a speech, a sentence for which comparison of pronunciation is to be performed.

According to an aspect, there is provided a contextual recognition-based pronunciation correcting apparatus, the apparatus including an interface configured to receive, from a speech recognition server, first text data obtained by converting speech data to a text, and a processor configured to extract a keyword from the received first text data, calculate a suitability of a word in the first text data in association with the extracted keyword, and update the first text data to second text data by replacing, with an alternative word, a word in the first text data having a suitability less than a preset reference value.

According to another aspect, there is provided a contextual recognition-based pronunciation correcting method, the method including receiving, from a speech recognition server, first text data obtained by converting speech data to a text, extracting a keyword from the received first text data, calculating a suitability of a word in the first text data in association with the extracted keyword, and updating the first text data to second text data by replacing, with an alternative word, a word in the first text data having a suitability less than a preset reference value.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIG. 5 is a diagram illustrating a method of calculating a suitability according to an example embodiment;

DETAILED DESCRIPTION

Figure 1:
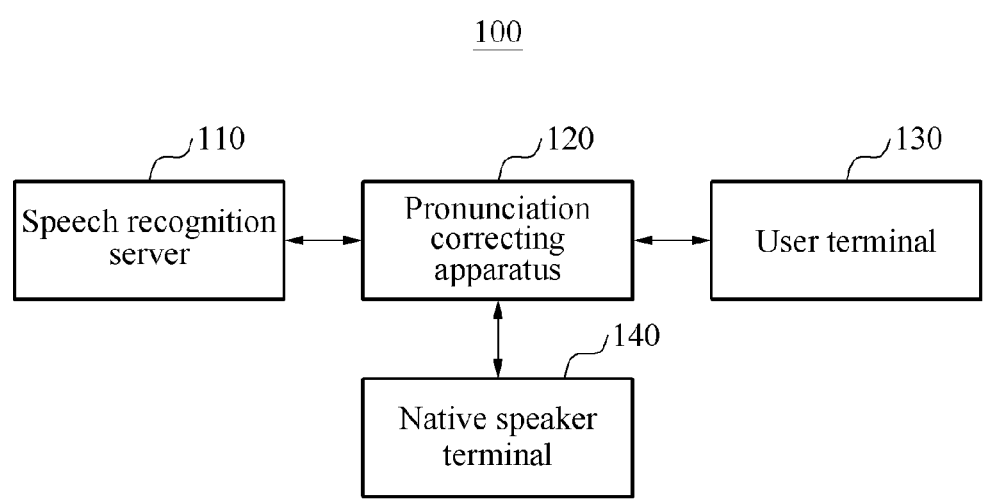
FIG. 1 is a diagram illustrating a pronunciation correcting system using a contextual recognition-based pronunciation correcting apparatus according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

A contextual recognition-based pronunciation correcting apparatus and method to be described hereinafter may convert speech data recorded from a user to first text data, extract a keyword from the first text data, analyze whether a word in the first text data is suitable for a context of the first text data based on the keyword, and output, as a speech or a vocalized text data, second text data in which an unsuitable word in the first text data is replaced with a suitable alternative word and the first text data.

FIG. 1 is a diagram illustrating a pronunciation correcting system 100 using a contextual recognition-based pronunciation correcting apparatus 120 according to an example embodiment.

Referring to FIG. 1, the pronunciation correcting system 100 includes the contextual recognition-based pronunciation correcting apparatus 120 (hereinafter simply referred to as the pronunciation correcting apparatus 120), a user terminal 130, and a native speaker terminal 140.

The pronunciation correcting apparatus 120 may receive, from a speech recognition server 110, first text data obtained by converting speech data recorded by the user terminal 130 to a text. The speech data may be recorded in various languages, for example, American English, British English, Chinese, Korean, and Portuguese. Hereinafter, speech data recorded in English will be described as an example, but examples of the present disclosure are not limited thereto.

The pronunciation correcting apparatus 120 may analyze a suitability of each word included in the first text data based on a context of the first text data received from the speech recognition server 110 and output, to the user terminal 130, second text data obtained by updating the first text data by replacing a word in the first text data having a relatively lower suitability with an alternative word suitable for the context based on a preset standard.

The pronunciation correcting apparatus 120 may transmit the second text data to the native speaker terminal 140 and receive, as an input, reviewed text data of the second text data in which the word with the relatively lower suitability is replaced with the alternative word.

A detailed description of the pronunciation correcting apparatus 120 will be provided hereinafter with reference to FIG. 2.

Figure 2:
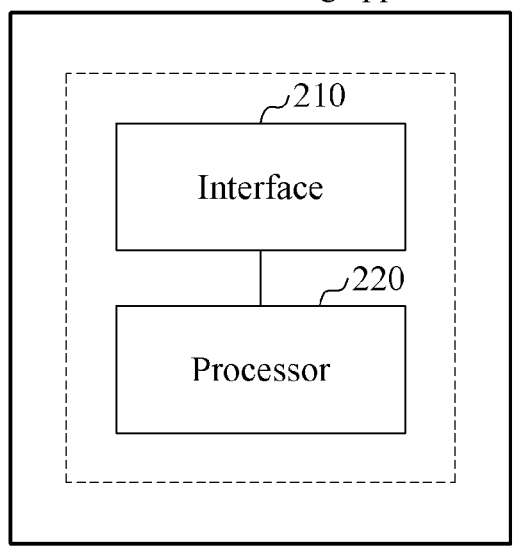
FIG. 2 is a diagram illustrating a contextual recognition-based pronunciation correcting apparatus according to an example embodiment.

FIG. 2 is a diagram illustrating a contextual recognition-based pronunciation correcting apparatus 200 according to an example embodiment.

Referring to FIG. 2, the contextual recognition-based pronunciation correcting apparatus 200 (hereinafter simply referred to as the pronunciation correcting apparatus 200) includes an interface 210 and a processor 220.

The interface 210 may receive, from a speech recognition server, first text data obtained by converting speech data to a text. The interface 210 may receive the first text data obtained by converting, to the text, the speech data recorded in a language selected by a user. For example, when the user selects English and utters "good morning," the interface 210 may receive "good morning" as the first text data obtained through the conversion of the speech data by the speech recognition server.

Here, n-th text data may be a single sentence or a single paragraph, where n denotes an integer. For example, the n-th text data may be a single sentence completed with a period at the end of the sentence. In addition, according to an example embodiment, the n-th text data may be a single paragraph including a plurality of sentences.

In addition, the interface 210 may transmit, to the speech recognition server, a portion of the speech data recorded from the user that is pronounced out of a present allowable range and receive, from the speech recognition server, the text data obtained by converting the portion to a text, and combine the received text data with the first text data. That is, the interface 210 may transmit, to the speech recognition server, a portion that is in an ambiguous speech state in lieu of the entire speech data. The allowable range may refer to a range satisfying a minimum requirement for speech recognition. For example, the allowable range may be set to include, for example, a case in which a sound volume of a portion of the speech data is less than or equal to a certain range, and a case in which a pronunciation of a portion of the speech data is not recognized.

For example, when pronunciation of a portion "Broad-Soft's portfolio of undefined communications" of the recorded speech data "UC is BroadSoft's portfolio of undefined communications and collaborative services" deviates from the allowable range and only "UC is _____ and collaborative services" is recognized as the first text data, the interface 210 may transmit, to the speech recognitions server, the portion of the speech data "BroadSoft's portfolio of undefined communications." The interface 210 may then receive, from the speech recognition server, a converted portion "BroadSoft's portfolio of undefined communications" and combine the converted portion with the first text data "UC is _____ and collaborative services" to obtain fully recognized text data "US is BroadSoft's portfolio of undefined communications and collaborative services.

Figure 3:
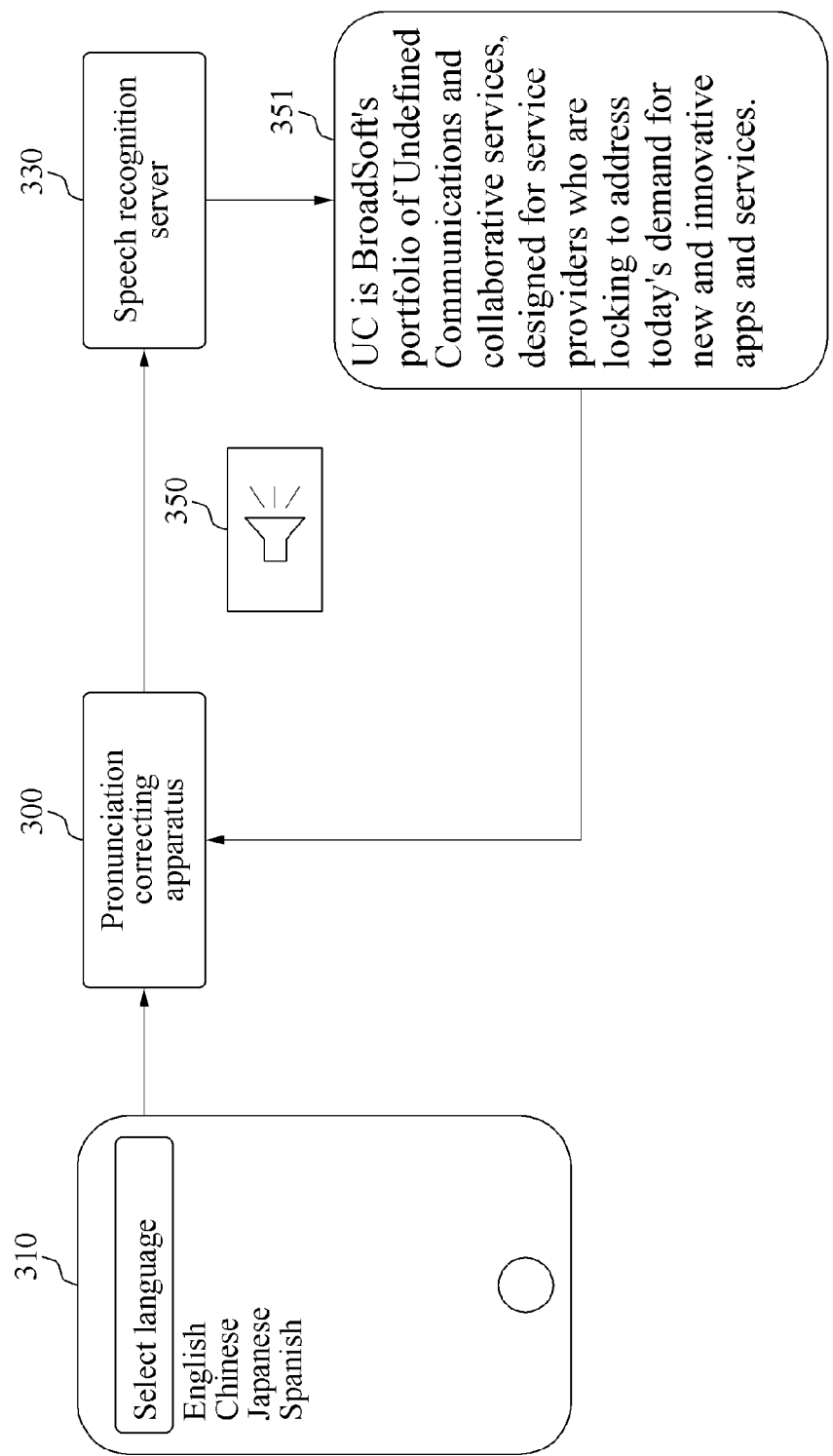
FIG. 3 is a diagram illustrating a method of converting speech data to first text data according to an example embodiment.

FIG. 3 is a diagram illustrating a method of converting speech data to first text data according to an example embodiment.

Referring to FIG. 3, a pronunciation correcting apparatus 300 may receive, from a user terminal 310, speech data 350 recorded in a language selected by a user. The pronunciation correcting apparatus 300 may not receive a sentence as an input by the user, but receive the speech data 350 in which a sentence for which the user desires to verify how to pronounce is recorded. Here, the pronunciation correcting apparatus 300 may provide the user terminal 310 with an interface for the user to select a language. For example, the pronunciation correcting apparatus 300 may provide the user terminal 310 with the interface for the user to select one from English, Chinese, Japanese, and Spanish.

The pronunciation correcting apparatus 300 may transmit, to a speech recognition server 330, an entirety or a portion of the speech data 350 and receive, from the speech recognition server 330, first text data 351 obtained through a conversion of the speech data 350 to a text. For example, the pronunciation correcting apparatus 300 may receive, from the speech recognition server 330, the first text data 351 "UC is BroadSoft's portfolio of undefined communications and collaborative services, designed for service providers who are locking to address today's demand for new and innovative apps and services."

A detailed description of the processor 220 will be provided with reference back to FIG. 2. For further understanding, the description will also be provided with reference to FIG. 4.

Figure 4:
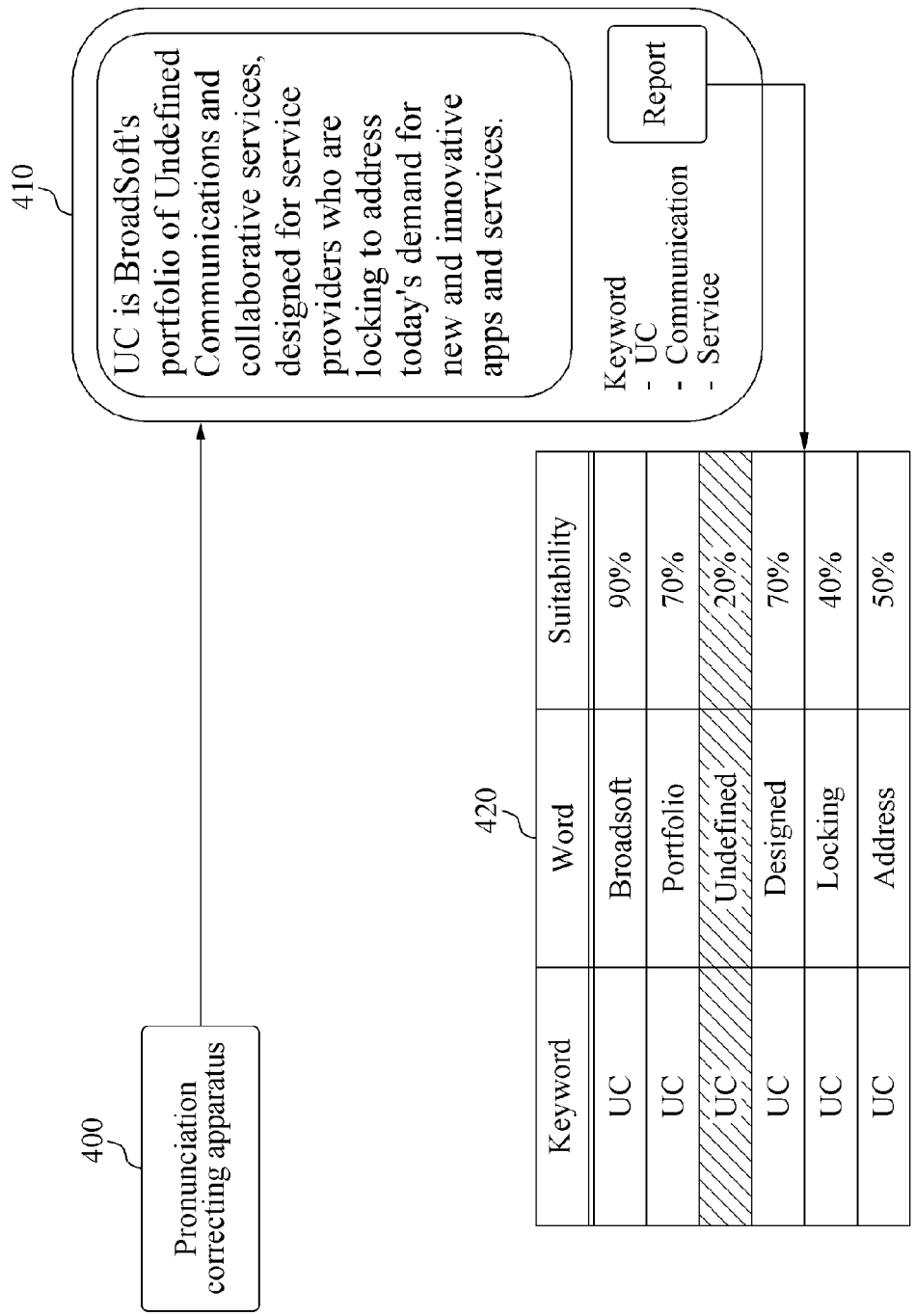
FIG. 4 is a diagram illustrating a method of analyzing first text data according to an example embodiment.

FIG. 4 is a diagram illustrating a method of analyzing first text data according to an example embodiment.

The processor 220 of FIG. 2 may extract a keyword from received first text data. The processor 220 may extract at least one keyword from the first text data including a plurality of words. For example, as illustrated in FIG. 4, at stage 410, a pronunciation correcting apparatus 400, for example, the processor 220 in detail, may extract a keyword, for example, "UC," "communication," and "service," from the first text data "UC is BroadSoft's portfolio of undefined communications and collaborative services, designed for service providers who are locking to address today's demand for new and innovative apps and services."

The processor 220 may calculate a suitability of a word in the first text data in association with the extracted keyword. As illustrated in FIG. 4, at stage 420, the pronunciation correcting apparatus 400, the processor 220 in detail, may calculate a context-based suitability of each word included in the first text based on the extracted keyword. Here, a suitability refers to a numerical value indicating a correlation between a word in a sentence and a keyword extracted from the sentence based on a context of the sentence. The suitability may vary based on present standards. A detailed description of the stage of calculating a suitability will be provided with reference to FIG. 5.

FIG. 5 is a diagram illustrating a method of calculating a suitability according to an example embodiment.

When first text data is "UC is BroadSoft's portfolio of undefined communications and collaborative services, designed for service providers who are locking to address today's demand for new and innovative apps and services" and "UC" is extracted as a keyword from the first text data, the processor 220 of FIG. 2 may calculate a suitability of each word in the first text data in association with the keyword "UC." For example, as illustrated in FIG. 5, the processor 220 may calculate a suitability of a word "Broad-Soft" in association with the keyword "UC" to be 90%, and a suitability of a word "undefined" in association with the keyword "UC" to be 20%.

The processor 220 may calculate a suitability of a word in the first text data by selecting exemplary text data including the keyword and dividing a frequency of use of the word in selected pieces of exemplary text data by the number of the selected pieces of exemplary text data. That is, the processor 220 may select a plurality of pieces of exemplary text data, and calculate a suitability of each word in the first text data based on a frequency of use of each word in the selected pieces of exemplary text data. For example, the processor 220 may calculate how many times a word in the first text data, for example, "BroadSoft," "portfolio," "undefined," "communication," . . . "apps," and "services," is used in the selected exemplary text data including the keyword "UC." For example, when the word "undefined" appears one time in five pieces of exemplary text data, the processor 220 may calculate a suitability of the word "undefined" to be 20%.

The processor 220 may select exemplary text data including the keyword, and calculate a suitability of a word in the first text data by decreasing the suitability of the word in proportion to a difference between a distance between the keyword and the word in the first text data and a distance between the keyword and the word in the selected exemplary text data. For example, the processor 220 may obtain such a difference by comparing a distance between the keyword "UC" and a word "BroadSoft" in exemplary text data and a distance between the keyword "UC" and the word "BroadSoft" in the first text data. When the difference between the distance between the keyword "UC" and the word "BroadSoft" in the first text data and the distance between the keyword "UC" and the word "BroadSoft" in the exemplary text data is greater, the processor 220 may calculate the suitability by decreasing the suitability based on the frequency and the like. When there is no difference between the distances, the processor 220 may calculate the suitability by decreasing the suitability by 0%. That is, the processor 220 may maintain the calculated suitability.

The processor 220 may verify a standard part of speech to be assigned to a location of a word in the first text data in association with the keyword. When the standard part of speech does not correspond to a part of speech of the word, the processor 220 may calculate a suitability of the word to be a preset minimum value. That is, the processor 220 may calculate the suitability of the word by verifying whether the part of speech of the word to be located contextually or grammatically in association with the keyword corresponds to the standard part of speech. For example, when the keyword is a noun and a standard part of speech of a word subsequent to the keyword is a verb, and the processor 220 verifies that the word at a corresponding location in the first text data is a noun, the processor 220 may calculate a suitability of the word to be 0% because a part of speech of the word does not correspond to the standard part of speech.

Here, the processor 220 may verify the standard part of speech to be assigned to the location based on a presence or absence of an accent to be placed on the location when the keyword and the word are pronounced together. That is, the processor 220 may verify a part of speech of a word based on an accent placed in a sentence of speech data pronounced by a user. For example, when a user pronounces a word "present" and an accent is placed on "p," the processor 220 may verify a part of speech of the word "present" to be a noun/adjective. When the user pronounces a word "present" and an accent is placed on "re," the processor 220 may verify a part of speech of the word "present" to be a verb.

The processor 220 may update the first text data to second text data by replacing, with an alternative word, a word having a suitability less than a preset reference value. That is, the processor 220 may update the first text data to the second text data by replacing the word having the suitability less than the reference value with the alternative word having a suitability greater than the reference value. For example, as illustrated in FIG. 5, when the reference value is set to be 30%, the processor 220 may update the first text data to the second text data by replacing the word "undefined" having a suitability of 20% with an alternative word having a suitability greater than the reference value of 30%.

The processor 220 may also verify a homonym of the word having the suitability less than the reference value, and determine the homonym to be the alternative word when a suitability of the homonym in association with the keyword is greater than or equal to the reference value. That is, the processor 220 may verify each homonym of a word in the first text data having a suitability less than the reference value, which is pronounced the same as the word but has a different meaning from the word, and determine, to be the alternative word, a homonym of the word that satisfies a preset standard by applying the homonym as the alternative word and comparing a suitability of the homonym to the reference value. For example, when a suitability of a word "sea" in the first text data is less than the reference value, and a homonym "see" of the word "sea" has a suitability greater than or equal to the reference value after being replaced for the word "sea," the processor 220 may determine the homonym "see" to be an alternative word of the word "sea."

Conversely, when a suitability of the homonym calculated in association with the keyword is less than the reference value, the processor 220 may determine, to be the alternative word, a word that is pronounced similarly to the word having the suitability less than the reference value, within a preset allowable range, but has a different part of speech from that of the word having the suitability less than the reference value. That is, the processor 220 may verify a word that is pronounced similarly to the word having the suitability less than the reference value and has a different part of speech from that of the word having the suitability less than the reference value, and determine a word that satisfies the preset standard to be the alternative word of the word having the suitability less than the reference value by applying the word as the alternative word and comparing a suitability of the word to the reference value. For example, when a suitability of a word "merry" in the first text data is less than the reference value, the processor 220 may determine, to be an alternative word of the word "merry," a word "marry" that is pronounced similarly to the word "merry" and has a different part of speech from that of the word "merry."

The processor 220 may transmit the second text data to a native speaker terminal along with a request for a review. That is, the processor 220 may transmit, to the native speaker terminal, the second text data obtained by updating the first text data by replacing a word in the first text data with an alternative word based on a suitability of the word. Here, the native speaker terminal refers to a terminal used by a native speaker or an educator (or a teacher) of a corresponding language, for example, a language of the second text data.

When a response for confirming the second text data is input from the native speaker terminal, the processor 220 may register the second text data as exemplary text data including the keyword. That is, when the review is completed by the native speaker terminal, the processor 220 may register the second text data as the exemplary text data to be selected for calculating a subsequent suitability.

In addition, the processor 220 may provide the second text data to a user terminal associated with the speech data, or output vocalized second text data to the user terminal. That is, the processor 220 may output the first text data, which is a sentence recognized through speech recognition by an initial recording by the user, and the second text data obtained by updating the first text data using the alternative word based on a context of the sentence. Here, the processor 220 may use a program that may vocalize a text, for example, a text to speech (TTS) engine, to convert the text to speech data, and output the speech data. A detailed description of a method of outputting the second text data will be provided hereinafter with reference to FIG. 6.

Figure 6:
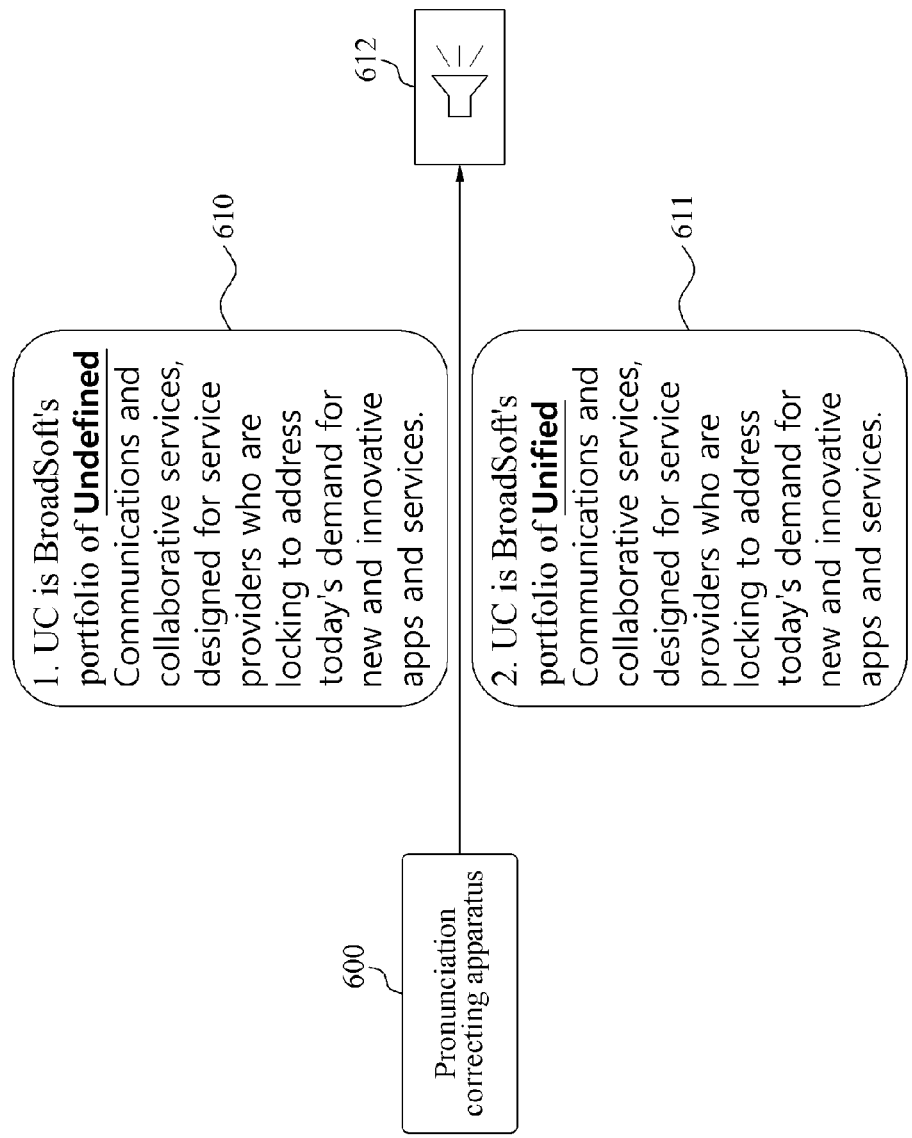
FIG. 6 is a diagram illustrating a method of outputting second text data according to an example embodiment.

FIG. 6 is a diagram illustrating a method of outputting second text data according to an example embodiment.

Referring to FIG. 6, a pronunciation correcting apparatus 600 may output, to a user terminal, speech data 612 that is obtained by vocalizing second text data 611 obtained by updating a word in first text data 610 to a suitable alternative word. The pronunciation correcting apparatus 600 may sequentially vocalize the first text data 610 and the second text data 611, and output the vocalized data. Here, the pronunciation correcting apparatus 600 may use a TTS engine to output text data as speech data.

For example, as illustrated in FIG. 6, the pronunciation correcting apparatus 600 may convert, to the speech data 612, the first text data 610 "UC is BroadSoft's portfolio of undefined communications and collaborative services, designed for service providers who are locking to address today's demand for new and innovative apps and services," and output the speech data 612.

In addition, the pronunciation correcting apparatus 600 may convert, to the speech data 612, the second text data 611 "UC is BroadSoft's portfolio of unified communications and collaborative services, designed for service providers who are locking to address today's demand for new and innovative apps and services," which is obtained by updating the first text data 610 by replacing a word "undefined" in the first text data 610 having a suitability less than a reference value (for example, 30%) with an alternative word "unified," and output the speech data 612.

The pronunciation correcting apparatus 600 may sequentially vocalize the two different sentences in which a difference in terms of pronunciation between the word "undefined" and the word "unified" occurs, and output the vocalized sentences, in order to allow a user to compare respective pronunciations.

Thus, the pronunciation correcting apparatus 600 may output, as speech data, an initially recognized sentence and a sentence modified based on a context so that the user may recognize a difference in pronunciation.

The pronunciation correcting apparatus 600 may provide the user terminal with a graph related to a recognition rate, for example, a pronunciation matching rate, based on a result of comparing the first text data 610 and the second text data 611. Thus, the pronunciation correcting apparatus 600 may allow the user terminal of the user to continuously manage the recognition rate using a log.

Referring back to FIG. 2, when a response for modifying the second text data is input from the native speaker terminal, the processor 220 may provide modified text data included in the response to the user terminal associated with the speech data, or output vocalized modified text data to the user terminal. That is, when a modification is needed as a result of reviewing the second text data, the processor 220 may output the modified text data from the native speaker terminal to the user terminal.

The pronunciation correcting apparatus 200 described above may extract a keyword from a sentence, and analyze a context of the sentence using a suitability of a word in the sentence based on a correlation between the extracted keyword and the word, and thus provide a more natural and general expression.

In addition, the pronunciation correcting apparatus 200 may provide, as a speech or vocalized data, an original sentence pronounced by a user and a sentence obtained by replacing an unsuitable word in the sentence with a suitable alternative word through contextual recognition, and thus may provide a difference in pronunciation that may occur in a relationship between words.

Further, the pronunciation correcting apparatus 200 may provide convenience by allowing a user to immediately input, as a speech, a sentence for which the user desires to verify pronunciation.

Figure 7:
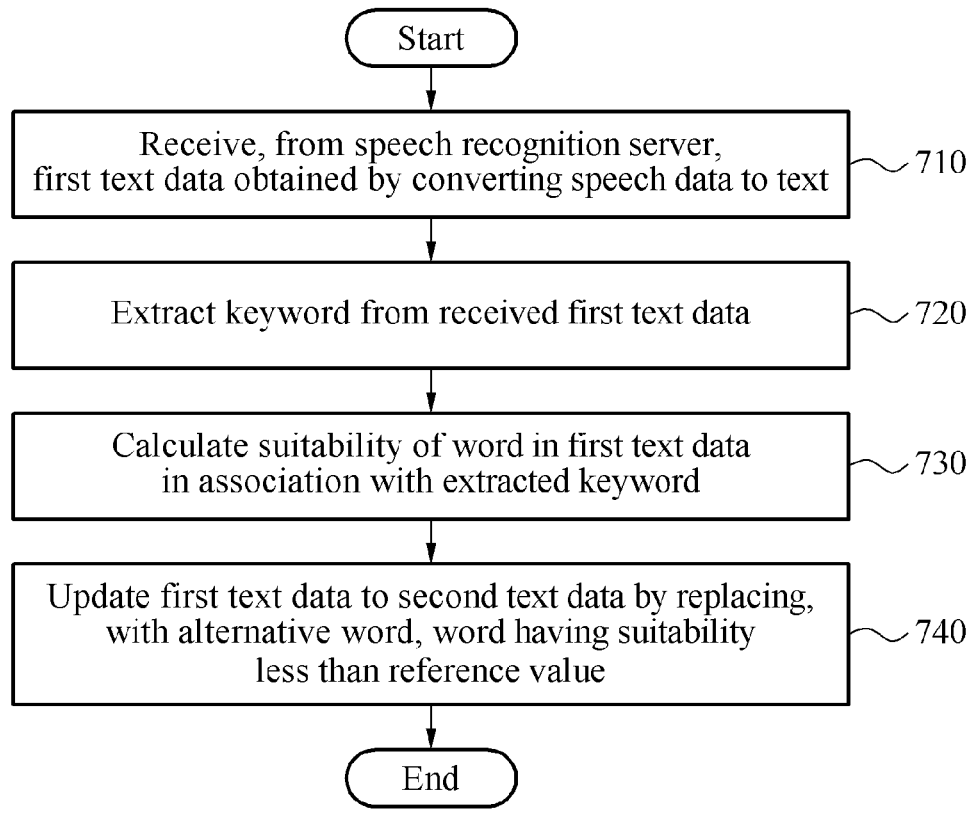
FIG. 7 is a flowchart illustrating a contextual recognition-based pronunciation correcting method according to an example embodiment.

FIG. 7 is a flowchart illustrating a contextual recognition-based pronunciation correcting method according to an example embodiment.

The contextual recognition-based pronunciation correcting method may be performed by the pronunciation correcting apparatus 200 described above with reference to FIG. 2.

Referring to FIG. 7, in operation 710, the pronunciation correcting apparatus 200 receives, from a speech recognition server, first text data obtained by converting speech data to a text. That is, operation 710 may be performed to receive the first text data obtained by converting, to the text, the speech data recorded in a language selected by a user. For example, when the user selects English and utters the speech data "good morning," the pronunciation correcting apparatus 200 may receive the first text data "good morning" obtained by converting the speech data to the text by the speech recognition server.

Here, n-th text data may be a single sentence or a single paragraph, where n denotes an integer. For example, the n-th text data may be a single sentence completed with a period at the end of the sentence. Alternatively, according to an example embodiment, the n-th text data may be a single paragraph including a plurality of sentences.

In addition, operation 710 may include transmitting, to the speech recognition server, a portion of the speech data recorded from the user that is pronounced out of a preset allowable range and receiving, from the speech recognition server, text data obtained by converting the portion to a text, and combining the received text data with the first text data. That is, the pronunciation correcting apparatus 200 may transmit, to the speech recognition server, a portion that is in an ambiguous speech state in lieu of the entire speech data. Here, the allowable range may refer to a range satisfying a minimum requirement for speech recognition. The allowable range may include, for example, a case in which a sound volume of a portion of the speech data is less than or equal to a certain range, and a case in which a pronunciation of a portion of the speech data is unrecognizable.

For example, when a portion "BroadSoft's portfolio of undefined communications" of the recorded speech data "UC is BroadSoft's portfolio of undefined communications and collaborative services" is pronounced out of the allowable range, and only "UC is _____ and collaborative services" is recognized as the first text data, the pronunciation correcting apparatus 200 may transmit the portion of the speech data "BroadSoft's portfolio of undefined communications" to the speech recognition server. The pronunciation correcting apparatus 200 may then receive, from the speech recognition server, the converted portion "BroadSoft's portfolio of undefined communications" and combine the converted portion with the first text data to obtain fully recognized text data "UC is BroadSoft's portfolio of undefined communications and collaborative services."

In operation 720, the pronunciation correcting apparatus 200 extracts a keyword from the received first text data. That is, operation 720 may be performed to extract at least one keyword from the first text data including a plurality of words. For example, the pronunciation correcting apparatus 200 may extract a keyword, for example, "UC," "communication," and "service," from the first text data "UC is BroadSoft's portfolio of undefined communications and collaborative services, designed for service providers who are locking to address today's demand for new and innovative apps and services."

In operation 730, the pronunciation correcting apparatus 200 calculates a suitability of a word in the first text data in association with the extracted keyword. That is, operation 730 may be performed to calculate a suitability of each word in the first text data in association with the extracted keyword based on a context. Here, the suitability refers to a numerical value indicating a correlation between a keyword and a word in a sentence based on a context of the sentence. The suitability may vary based on preset standards.

In addition, operation 730 may include selecting exemplary text data including the keyword, and calculating a suitability of a word in the first text data by dividing a frequency of use of the word in selected pieces of exemplary text data by the number of the pieces of exemplary text data. That is, the pronunciation correcting apparatus 200 may select a plurality of pieces of exemplary text data, and calculate a suitability based on a number of times each word in the first text data appears in the pieces of exemplary text data. For example, the pronunciation correcting apparatus 200 may calculate a frequency of use of a word included in the first text data, for example, "BroadSoft," "portfolio," "undefined," "communications," . . . , "apps" and "services," in the selected pieces of exemplary text data including the keyword "UC." For example, when a frequency of use of a word "undefined" in selected five pieces of exemplary text data is one time, for example, when the word "undefined" appears only one time in the selected five pieces, the pronunciation correcting apparatus 200 may calculate a suitability of the word "undefined" to be 20%.

In addition, operation 730 may include selecting exemplary text data including the keyword, and calculating a suitability of a word in the first text data by decreasing the suitability of the word in proportion of a difference between a distance between the keyword and the word in the first text data and a distance between the keyword and the word in the exemplary text data. For example, the pronunciation correcting apparatus 200 may calculate the difference between the distances by comparing, for example, a distance between the keyword "UC" and a word "BroadSoft" in the first text data and a distance between the keyword "UC" and the word "BroadSoft" in the exemplary text data. When the difference between the distance between the keyword "UC" and the word "BroadSoft" in the first text data and the distance between the keyword "UC" and the word "BroadSoft" in the exemplary text data increases, the pronunciation correcting apparatus 200 may calculate the suitability by decreasing the suitability based on the frequency and the like. When there is no difference between the distances, the pronunciation correcting apparatus 200 may calculate the suitability by decreasing the suitability by 0%, or maintain the calculated suitability.

In addition, operation 730 may also include verifying a standard part of speech to be assigned to a location of the word in the first text data in association with the keyword, and calculating the suitability of the word to be a preset minimum value when the standard part of speech does not correspond to a part of speech of the word. That is, the pronunciation correcting apparatus 200 may calculate the suitability by verifying whether the part of speech of the word to be located grammatically or contextually in association with the keyword corresponds to the standard part of speech. For example, when the keyword is a noun and a following word of the keyword is a verb as a standard part of speech, and a word being at a corresponding location in the first text data is verified to be a noun, the pronunciation correcting apparatus 200 may calculate the suitability of the word to be 0% because a part of speech of the word does not correspond to the standard part of speech.

The verifying of the standard part of speech in operation 730 may include verifying the standard part of speech to be assigned to the location based on an accent to be placed on the location when the keyword and the word are pronounced together. That is, the pronunciation correcting apparatus 200 may verify the part of speech of the word that may have a different part of speech depending on an accent, based on an accent in a sentence pronounced by the user associated with the speech data. For example, when a word "present" is pronounced, the pronunciation correcting apparatus 200 may verify a part of speech of the word "present" to be a noun/adjective when an accent is placed on "p," and to be a verb when the accent is placed on "re."

In operation 740, the pronunciation correcting apparatus 200 updates the first text data to the second text data by replacing, with an alternative word, a word in the first text data having a suitability less than a preset reference value. That is, operation 740 may be performed to update the first text data to the second text data by replacing the word having the suitability less than the reference value with the alternative word having a suitability greater than the reference value. For example, when the reference value is set to be 30%, the pronunciation correcting apparatus 200 may update the first text data to the second text data by replacing a word "undefined" having a suitability of 20% with an alternative word having a suitability of 30% or higher.

According to an example embodiment, the pronunciation correcting apparatus 200 may verify a homonym of the word having the suitability less than the reference value, and determine the homonym to be the alternative word when a suitability of the homonym in association with the keyword is greater than or equal to the reference value. That is, the pronunciation correcting apparatus 200 may verify each homonym that is pronounced the same as the word having the suitability less than the reference value and has a different meaning from the word, and determine, to be the alternative word, a homonym that satisfies a preset standard by applying the homonym as the alternative word and comparing a suitability of the homonym to the reference value. For example, when a suitability of a word "sea" in the first text data is less than the reference value, and a suitability of a homonym "see" of the word "sea" is greater than or equal to the reference value when being replaced for the word "sea," the pronunciation correcting apparatus 200 may determine the homonym "see" to be an alternative word of the word "sea."

According to an example embodiment, when the suitability of the homonym in association with the keyword is less than the reference value, the pronunciation correcting apparatus 200 may determine, to be the alternative word, a word pronounced similarly to the word having the suitability less than the reference value within a preset allowable range and having a different part of speech from the word. That is, the pronunciation correcting apparatus 200 may verify a word that is pronounced similarly to the word having the suitability less than the reference value and has a different part of speech from that of the word, and determine, to be the alternative word, a word satisfying a preset standard by applying the word as the alternative word and comparing a suitability of the applied word to the reference value. For example, when a suitability of a word "merry" in the first text data is less than the reference value, the pronunciation correcting apparatus 200 may determine, to be an alternative word of the word "merry," a word "marry" that is pronounced similarly to the word "merry" within the allowable range and has a different part of speech from that of the word "merry."

The pronunciation correcting apparatus 200 may transmit the second text data along with a request for a review to a native speaker terminal. That is, the pronunciation correcting apparatus 200 may transmit, to the native speaker terminal, the second text data obtained by updating, to the alternative word, the word in the first text data having the suitability less than the reference value based on a suitability of each word in the first text data. Here, the native speaker terminal refers to a terminal used by a native speaker or an educator using a corresponding language, or a language of the second text data.

When a response for confirming the second text data is input from the native speaker terminal, the pronunciation correcting apparatus 200 may register the second text data as exemplary text data including the keyword. That is, when the review is completed by the native speaker terminal, the pronunciation correcting apparatus 200 may register the second text data as the exemplary text data to be selected for calculating a subsequent suitability.

The pronunciation correcting apparatus 200 may provide the second text data to a user terminal associated with the speech data, or output vocalized second text data to the user terminal. That is, the pronunciation correcting apparatus 200 may output the first text data, which is a sentence recognized through speech recognition by an initial recording from the user, and the second text data, which is obtained through the updating using the alternative word based on a context. Here, the pronunciation correcting apparatus 200 may use a program that may vocalize a text, for example, a TTS engine, to convert a text to speech data, and output the speech data.

When a response for modifying the second text data is input from the native speaker terminal, the pronunciation correcting apparatus 200 may provide modified text data included in the response to the user terminal associated with the speech data, or output vocalized modified text data to the user terminal by vocalizing the modified text data. That is, when a modification is needed as a result of reviewing the second text data, the pronunciation correcting apparatus 200 may output the modified text data from the native speaker terminal to the user terminal.

Thus, the pronunciation correcting method described herein may provide and recommend a more natural and general expression by extracting a keyword from a sentence and analyzing a context of the sentence using a suitability of a word in the sentence based on a correlation between the extracted keyword and the word.

In addition, the pronunciation correcting method may provide a difference in pronunciation that may occur in a relationship among words by providing, as a speech or vocalized data, an original sentence pronounced by a user and a sentence in which an unsuitable word in the original sentence is replaced with a suitable alternative word by contextual recognition.

Further, the pronunciation correcting method may provide a user with convenience by allowing the user to immediately input a sentence for comparison of pronunciation is to be performed.

According to example embodiments described herein, by extracting a keyword from a sentence and analyzing a context of the sentence using a suitability of a word in the sentence based on a correlation between the extracted keyword and the word, a more natural and general expression may be provided and recommended.

According to example embodiments described herein, by providing a speech, or a vocalized sentence, of an original sentence pronounced by a user and a sentence in which an unsuitable word is replaced with a suitable alternative word by contextual recognition, a difference in terms of pronunciation between words may be provided.

According to example embodiments described herein, an apparatus and method described herein may provide a user with convenience by allowing the user to immediately input, as a speech, a sentence for which comparison of pronunciation is to be performed.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A contextual recognition-based pronunciation correcting apparatus, comprising:
    an interface configured to receive, from a speech recognition server, first text data obtained by converting speech data to a text; and
    a processor configured to extract a keyword from the received first text data, calculate a suitability of a word in the first text data in association with the extracted keyword, and update the first text data to second text data by replacing, with an alternative word, a word in the first text data having a suitability less than a preset reference value,
    wherein the processor is configured to select exemplary text data including the keyword, and calculate the suitability by dividing a frequency of use of the word in selected pieces of exemplary text data by a number of the pieces of exemplary text data.

2. The apparatus of claim 1, wherein the processor is configured to select exemplary text data including the keyword, and calculate the suitability by decreasing the suitability in proportion to a difference between a distance between the keyword and the word in the first text data and a distance between the keyword and the word in the selected exemplary text data.

3. The apparatus of claim 1, wherein the processor is configured to verify a standard part of speech assigned to a location of the word in the first text data in association with the keyword, and calculate the suitability to be a preset minimum value when the standard part of speech does not correspond to a part of speech of the word.

4. The apparatus of claim 3, wherein the processor is configured to verify the standard part of speech assigned to the location based on a presence or absence of an accent placed on the location when the keyword and the word are pronounced together.

5. The apparatus of claim 1, wherein the processor is configured to verify a homonym of the word having the suitability less than the reference value, and determine the homonym to be the alternative word when a suitability of the homonym in association with the keyword is greater than or equal to the reference value.

6. The apparatus of claim 5, wherein, when the suitability of the homonym in association with the keyword is less than the reference value, the processor is configured to determine, to be the alternative word, a word pronounced similarly to the word according to a preset allowable range, and being a part of speech different from a part of speech of the word.

7. The apparatus of claim 1, wherein the interface is configured to transmit, to the speech recognition server, a portion of the speech data recorded from a user that is pronounced out of a preset allowable range and receive, from the speech recognition server, text data obtained by converting the portion to a text, and combine the received text data with the first text data.

8. The apparatus of claim 1, wherein, after the second text data is transmitted along with a request for a review to a native speaker terminal of a native speaker of a language of the second text data, the processor is configured to register the second text data as exemplary text data including the keyword when a response for confirming the second text data is input from the native speaker terminal, or
    the processor is configured to provide modified text data to a user terminal associated with the speech data or output vocalized modified text data to the user terminal when a response for modifying the second text data is input from the native speaker terminal.

9. The apparatus of claim 1, wherein the processor is configured to provide the second text data to a user terminal associated with the speech data, and output vocalized second text data to the user terminal.

10. A contextual recognition-based pronunciation correcting method, comprising:
    receiving, from a speech recognition server, first text data obtained by converting speech data to a text;
    extracting a keyword from the received first text data;
    calculating a suitability of a word in the first text data in association with the extracted keyword; and
    updating the first text data to second text data by replacing, with an alternative word, a word in the first text data having a suitability less than a preset reference value,
    wherein the calculating of the suitability comprises:
    selecting exemplary text data including the keyword; and
    calculating the suitability by dividing a frequency of use of the word in selected pieces of exemplary text data by a number of the pieces of exemplary text data.

11. The method of claim 10, wherein the calculating of the suitability comprises:
    selecting exemplary text data including the keyword; and
    calculating the suitability by decreasing the suitability in proportion to a difference between a distance between the keyword and the word in the first text data and a distance between the keyword and the word in the selected exemplary text data.

12. The method of claim 10, wherein the calculating of the suitability comprises:
    verifying a standard part of speech assigned to a location of the word in the first text data in association with the keyword; and
    calculating the suitability of the word to be a preset minimum value when the standard part of speech does not correspond to a part of speech of the word.

13. The method of claim 10, further comprising:
    verifying a homonym of the word having the suitability less than the reference value; and
    determining the homonym to be the alternative word when a suitability of the homonym in association with the keyword is greater than or equal to the reference value.

14. The method of claim 10, wherein the receiving of the first text data from the speech recognition server comprises:
    transmitting, to the speech recognition server, a portion of the speech data recorded from a user that is pronounced out of a preset allowable range; and
    receiving, from the speech recognition server, text data obtained by converting the portion to a text, and combining the received text data with the first text data.

* * * * *